R. McCLENATHEN.
MOLDING MACHINE.
APPLICATION FILED NOV. 9, 1921.

1,423,349.

Patented July 18, 1922.

INVENTOR
ROBERT McCLENATHEN
BY R.H.Waters
ATTORNEY.

UNITED STATES PATENT OFFICE.

ROBERT McCLENATHEN, OF AKRON, OHIO, ASSIGNOR TO KELLY-SPRINGFIELD TIRE COMPANY, OF AKRON, OHIO, A CORPORATION OF NEW JERSEY.

MOLDING MACHINE.

1,423,349.   Specification of Letters Patent.   Patented July 18, 1922.

Application filed November 9, 1921. Serial No. 513,986.

*To all whom it may concern:*

Be it known that I, ROBERT MCCLENATHEN, a citizen of the United States, residing at Akron, in the county of Summit and State of Ohio, have invented certain new and useful Improvements in a Molding Machine, of which the following is a specification.

This invention relates to the art of forming strips of moldable material by the continuous operation method, wherein it is desired that the finished article be permanently molded to a predetermined form by the agencies of heat and pressure exerted in combination with mechanical forming means. In the particular embodiment disclosed, by way of illustration only, the invention is applied to the molding and vulcanizing of what is known in the tire manufacturing art as flaps, the same being annular articles made up of a plurality of superposed narrow strips of rubberized fabric, thereafter molded to a desired curvature, and utilized as a protector between the rim portion of a wheel and the more or less delicate structure of the inflatable inner tube.

A flap should be prepared to conform to the cross sectional contour of the inner tube with which it is to become associated, also to conform with the diameter of the rim upon which it is to be placed. All flaps are made to agree with the cross sectional contour of the tube, at least approximately, but not all are molded with the desired diametrical contour; the failure to attain the last named requirements necessarily is a defect that manifests its presence by buckling of the edges when the flap is bent around the rim, the extent depending upon whether the article is formed of bias-cut or straight woven fabric. A flap made straight and thereafter bent about a rim, at the expense of buckling the free edges, is a constant menace to the life of an inner tube, due to the chafing of the latter against the inequalities of the former—a condition tending to rapidly destroy the tube.

Appliances are available for forming a flap with both cross sectional and diametrical permanent set, all as presently explained, but none of the expedients is effective for the continuous and economical operation attained by my invention. It should here be noted that the vulcanization of a flap requires approximately ten minutes, more or less, dependent upon the character of the chemical agent present in the rubber solution; thus requiring that each unit length of the article shall be continuously exposed to the heat and pressure treatment for the period indicated.

It is old in the art to cure these prepared strips of rubberized fabric by vulcanizing them in a step-by-step process on quadrant drums, such, for instance, as that disclosed in Patent No. 1,179,738 to T. C. Marshall dated April 18, 1916; but as this process is intermittent and requires approximately ten minutes of pressure on every portion of the article before such section can be relieved and a new section of the continuous strip drawn within the operative zone, it is obvious that the operation is slow and the expenditure of manual effort considerable.

It is also old to cut the strips of raw flap material into lengths and wind each piece on an annular mandrel or place it within a suitable mold and then subject the same to a vulcanizing heat accompanied by pressure whereby a complete annular flap is produced as a finished unit; but this procedure is expensive and too slow to respond to the requirements of quantity production.

Again it is not new in the art to vulcanize the flaps by the continuous operation method, as by providing a pair of heated cylindrical drums arranged in parallelism and adapted to be rotated to draw a continuous raw flap progressively over their surfaces from one end to the other, the drums having helical grooves on their surfaces and being of such length that the advancing material will be exposed to the heating and molding effect long enough to retain a permanent cross sectional set. In this process the pressure necessary to seat the flap in the grooves that form its cross sectional contour is accomplished by tension on the flap itself with, or without, a single point of contact mechanical pressure member; which tension on the flap tends to destroy the circumferential curvature imparted to portions of it successively by passage over the radial surface of the cylindrical drums. In short, this parallel drum device with stock under tension is adapted to mold a desired cross sectional contour to the flap but not to impart a permanent circumferential set desirable to conform the article to the diameter of the tire with which it is to be associated. The parallel drums are capable of fast work, but no more efficient for initially imparting permanent diametrical contour than the straight platen presses, also occasionally used for the production of these accessories.

The desideratum in designing a flap curing device is that the article shall be delivered from the machine with a cross sectional set and a permanent diametrical contour approximating that of the rim upon which it is to be used as a protector for the tube and that the whole process shall be performed economically and expeditiously.

Being cognizant of the limitation inherent in the outstanding appliances available for the purpose of flap curing, it is the object of the present invention to provide a device that will efficiently produce flaps of indefinite length by the continuous method, wherein the article will be molded with not only the desired cross sectional set but impart and preserve also the very essential feature of permanent diametrical contour approximating that of the rim it is to become associated with. To the attainment of this and other objects herein appearing, this invention comprises the novel means provided and fully disclosed; it being noted that the particular mechanism selected, by way of illustration of the fundamental principles, may be varied through a wide range of equivalents without departing from the scope and spirit of the appended claims:

In proceeding with the detailed description of the device it is observed that only a general outline of the proposed mechanical routine of assembly and association of operative mechanism is referred to, it being obvious, to those well skilled in the art, that the disclosed invention is susceptible of practice by the selection of a wide range of conventional mechanisms.

Numeral 10 represents a hollow cylindrical drum adapted to be steam heated internally in the well known manner and horizontally mounted for revolution about its axis. Numeral 11 is a counterpart member of 10 mounted parallel with and below 10. These members are made to revolve about their centers at the same speed and in the same direction by means of gearing indicated generally by 12. Cut in the surface of each drum and in vertical alinement, are an indefinite number of V-shaped annular grooves designed to impart the desired cross sectional set to the flap as it is molded by the hereafter described coacting members.

Co-operating with each groove in each drum is an endless chain comprising segmental links 14, so designed and tensioned that the contacting portions on each of the drums covers about half of its circumference in a manner adapted to confine and compress the flap stock whereby it is molded and vulcanized to a permanent cross sectional set and at the same time impressed with curvature coincident with the radius of the drum groove.

Figure 1:
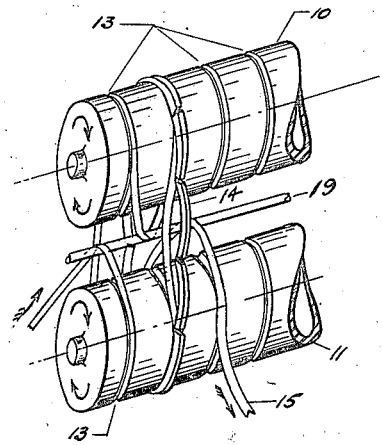
Figure 1 is a partially completed perspective, somewhat diagrammatic, of the invention, particularly showing one molding chain assembled.
Figure 2:
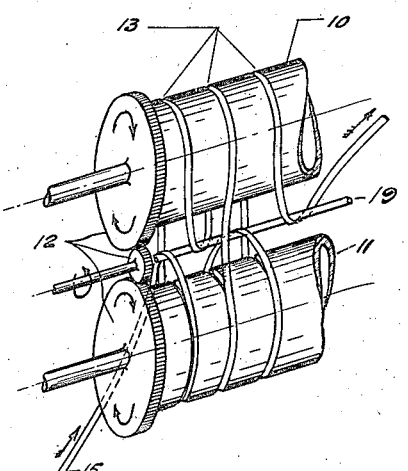
Figure 2 is similar to Figure 1 except the drum rotating mechanism is shown and the advancing flap material is indicated generally in its passage over the drums—the molding chains being arbitrarily omitted.

The flap is indicated by 15, it being understood that this item is usually made up of layers of rubberized fabric containing a vulcanizing agent adapted to retain the structure in any shape in which it is molded. In Figures 1 and 2 the directon of the flap over the drums is indicated generally; it being noted that, for the purpose of illustration, only one chain is shown in Figure 1, and all chains arbitrarily removed from Figure 2. Also a suitable cross over guide member between the drums is indicated as 19.

The leading end of the flap stock is threaded successively into each vertically alined groove of each drum and under the molding chain coacting therewith, then crossed over in the clearance space between the drums and threaded into the adjacent registers, in the manner described and illustrated, until the entire length of the drums has been covered and every portion of the threaded in stock thus subjected to the pressure of each zone of engagement of each chain on the alined grooves of the upper and lower drums; the drums to be rotated slowly during this threading in process. Once the flap is threaded in, the rotation of the drums and the frictional contact of the chains with the flap will continuously draw the material through the vulcanizer.

As a particular object of the invention is to preserve the circumferentially molded contour of the flap, which contour is that of the radius of the drum groove and approximately that of the actual wheel rim, it is important that in threading-in the flap the excess or slack noted at the point of cross over between the drums is to be carefully provided for in order that no tension may exist in the flap between drum and drum. As the diameters of all grooves are identical, and the drums axially spaced in parallelism and rotated at the same speed, the initial slack at cross over will be self maintained, and thus the diametrical molded curvature in the flap will be preserved throughout the progress of the material over the vulcanizer grooves.

Figure 3:
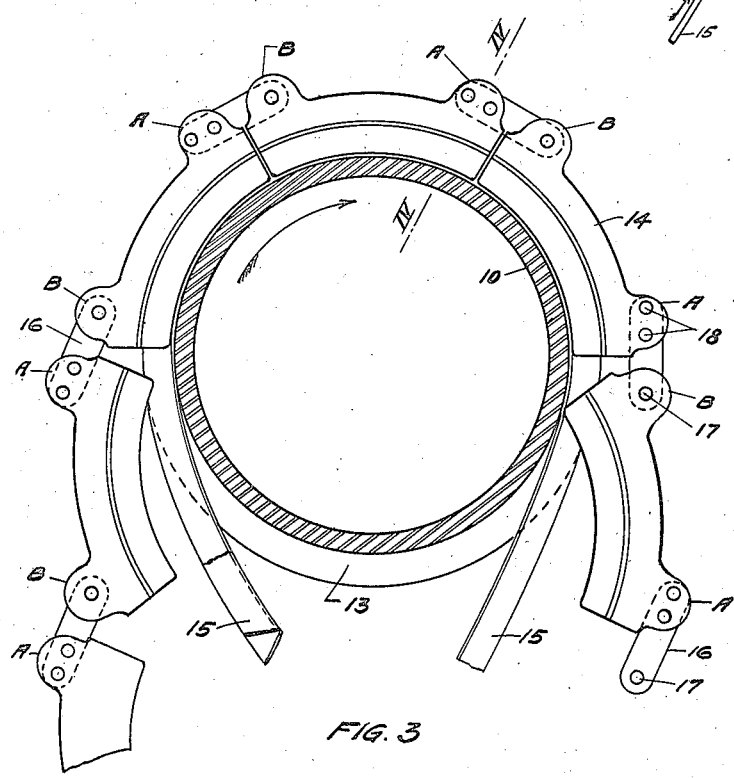
Figure 3 is a section through the upper complemental drum taken at the bottom of a molding groove and particularly illustrating the action of the articulated molding chain with respect to contact with the flap.
Figure 4:
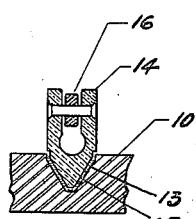
Figure 4 is a section through IV—IV of Figure 3, showing the co-operation of the molding chain with the drum groove.

Particular stress is laid on the design of the link connections of the chain segments 14 for the purpose of avoiding pinching of the flap in the closing gap between the sections at the point of tangential contact with the rotating drum on the incoming side of the flap. (See Fig. 3). Each link segment has a leading end "A" and a following end "B," as defined by the direction of take-up on the rotating drums. Between the radially cut abutting ends of each pair of segments is a link 16, one end being pivotally connected at "B" by a journal bolt 17, the extending portion being held in a fixed position within the "A" end by pins 18. The purpose of this fixed end link is apparent by inspection of Figure 3, wherein, on the left side at about the point of tangency of chain contact it is noted that the link segment about to be drawn into engagement is held off from contact with the flap and drum by the resistance of the fixed link to the component of forces tending to prematurely swing the inner leading corner of the "A" end of the segment against the flap. The action of the fixed link end at "A" insures that the closing of the gap between the abutting ends of the links will be by a partially radial adjustment, while the leading corner of A is held away from contact with the drum and flap, rather than by a circumferential slippage of the said corner along the intervening section of flap between the gaping inner corners of the segments affected. By the particular linkage designed the closing in of the radially cut ends of segments on their pull-on side of the drums is efficiently attained without pinching or crowding up the flap material at that point.

In the illustrative embodiment of the invention the grooves in the drums have been indicated widely spaced, but it is possible and preferable to have them intimately grouped for the purpose of economizing the length of the drum elements. The heat incident to the molding and vulcanizing has been referred to as provided by steam introduced within the hollow drums, but it is apparent that the drum could be heated electrically or that the link segments of the chain could be so heated.

The particular disclosure has been adapted to the molding and vulcanizing of flap stock of indefinite length, but it is apparent that the invention could be put to an analogous service in performing a like operation upon any article of manufacture susceptible of similar treatment. The cross sectional form of the drum groove and that of the complemental segmental pressure member may be varied at will to suit the selective use; all without departing from the scope of the appended claims.

I claim:—

1. A machine of the character described comprising a plurality of spaced apart cylindrical drums of identical diameter having counterpart circumferential grooves in alined relation; associated driving means for revolving all drums at the same speed; and an articulated circulating pressure member in each groove of each drum, said pressure member being adapted to register with said grooves and to be circumferentially advanced simultaneously over the drums.

2. A machine of the character described comprising a pair of spaced apart cylindrical drums of identical diameter having counterpart circumferential grooves in alined relation; means for driving said drums at the same speed; means for heating said drums; and an articulated pressure member engaged within each set of alined grooves in each drum under tension, whereby the rotation of the drums affects linear movement of said pressure member by frictional contact.

3. A machine of the character described comprising a pair of counterpart grooved and heated spaced apart cylindrical drums mounted axially in parallel relation and rotated together at the same speed; separate articulated endless pressure chains frictionally engaging alined grooves in each drum whereby rotation of said drums advances said chain at the peripheral speed of the drums, said chains being in pressed contact with approximately the semi-circumference of each of two alined cylinder grooves.

4. A machine of the character described comprising two cylindrical revoluble drums axially mounted in parallelism and having a counterpart circumferential alined grooves; a pressure member encompassing said drums in frictional engagement with said grooves, said member comprising a plurality of linked segments coincident with the peripheral contour of said grooves and shaped to sectionally conform thereto; and driving means adapted to rotate said drums at the same speed whereby the pressure member is advanced about said opposed drums without slippage.

5. A machine of the character described, comprising a plurality of grooved and spaced apart drums, axially mounted and rotatable at the same speed; and an articulated endless pressure member girding corresponding grooves in each drum, and pressure member comprising segmental links radially coincident with the periphery of said grooves and sectionally registering therewith.

6. A machine of the character described, comprising a plurality of spaced apart drums axially mounted in parallelism, said drums having corresponding counterpart grooves continuous around their circumferences; means for rotating the drums at the same speed; and a plurality of belt-like endless pressure members conformably girding corresponding grooves of each drum over approximately their semi-circumference, whereby rotation of said drum circulates said pressure members thereon without slippage.

7. A machine of the character described, comprising revoluble cylindrical drums having corresponding counterpart grooves adapted to accommodate a moldable stock supply; and a pressure member comprising an endless circulating linkage conforming to the radial and cross sectional contour of said grooves, said pressure member confining the stock within the grooves under molding pressure over approximately the semi-circumference thereof, said pressure member having connecting means between abutting links coacting with means on the links whereby the advancing end of each link at the approximate point of tangential approach to the cylinder is arbitrarily prevented from circumferentially pinching the stock, substantially as set forth.

8. A machine for molding and vulcanizing flap stock composed of rubberized fabric, comprising a plurality of parallel revoluble cylindrical drums having multiple alined grooves adapted to contain stock threaded into each groove successively with an excess of slack intermediate the drums; and articulated endless pressure members girding the semi-circumference of each of two alined grooves and conformable thereto, whereby the stock is confined under pressure and whereby rotation of the drums draws the stock progressively toward one end of the drums and causes each unit length thereof to be successively subjected to the zones of pressure of each member in each groove of each drum without exerting tension in said stock.

9. In a device of the character described, an endless linkage adapted to traverse and conform with the grooved semi-circumference of a cylinder, said linkage comprising segmental links provided with a leading end "A" and a following end "B", adjacent links being united by a connecting member pivotally attached to "B" and rigidly to "A", whereby the end "A" is arbitrarily prevented from normal tangential contact with the oncoming surface of said cylinders, for the purpose set forth.

In testimony whereof I affix my signature.

ROBERT McCLENATHEN.